Dec. 15, 1936.  P. A. PETERS  2,064,446
HEADLIGHT
Filed Feb. 8, 1934
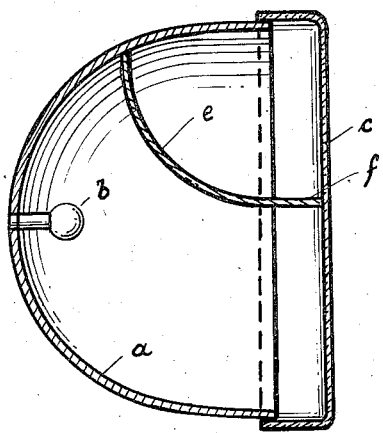
INVENTOR
PETER ANTON PETERS
BY C. P. Joepel
ATTORNEY Patented Dec. 15, 1936

2,064,446

UNITED STATES PATENT OFFICE 2,064,446

HEADLIGHT

Peter Anton Peters, Essen, Ruhr, Germany

Application February 8, 1934, Serial No. 710,307
In Germany February 10, 1933

2 Claims. (Cl. 240—48.4)

This invention relates to head-lights for automobiles or other vehicles and has for its object primarily to provide a head-light which is free of the defects of known devices of this kind, said defects consisting essentially therein that the road in front of the vehicle is insufficiently lighted and that the head-light produces an undesirable dazzling effect upon persons on the road in front of the vehicle.

Constructions of head-lights are known making use of a plane or concave mirror mounted between the front pane of the headlight and its source of light, said mirror covering up essentially the upper half of the space between the reflector and said pane with a view of preventing dazzling of persons looking in direction against the travel of the vehicle. Head-lights of this kind, however, are connected with the disadvantage that the road in front of the vehicle is only insufficiently lighted which is due to the fact that the light-rays emanate from the head-light essentially parallel to each other so that the driver will be unable to overlook with sufficient security the part of the road which is shortly in front of the vehicle and to recognize eventual obstacles, such as persons, holes in the road and curvatures of the latter.

The aforementioned drawbacks inherent to known constructions of head-lights are obviated by my invention essentially by making the aforementioned mirror within the space between the front-pane and the light-source of the head-light in the form of a convex mirror. The advantage of this new construction consists essentially therein that the light-rays reflected by said convex mirror will be properly distributed over the surface of the road and that in consequence thereof the latter will be more uniformly illuminated than had been possible with head-lights of known construction.

According to my invention, furthermore, the under edge of said convex mirror is provided with a prolongation having the form of a plane mirror directed along the axis of the reflector of the head-light, said plane mirror serving the purpose of preventing eventual upwardly directed light-rays to leave the head-light.

In the accompanying drawing which forms part of this specification I have represented an example of a construction of my new head-light, the drawing showing the latter essentially in a vertical section.

Referring more particularly to the drawing, my new head-light comprises a reflector $a$, a source of light $b$ mounted at the focus of said reflector, a front pane $c$ fixed to said reflector which latter is beaded round said pane, and the novel convex mirror $e$ fixed to said reflector and said pane within a groove provided therein. The under edge of said convex mirror is further prolonged in horizontal direction to form a plane mirror which is of a length amounting to about 5 cm, as shown at $f$.

I claim:

1. In a vehicle head lamp having a main concave reflector, a convex reflector which covers substantially the upper half of the head lamp, mounted between the front glass of the lamp and the source of light and disposed substantially entirely within the area of the main reflector, the convex surface of the reflector being arranged to face the source of light and the lower edge of the convex reflector being disposed above the axial center of the source of light whereby direct horizontal rays may be projected forwardly by the main reflector.

2. In a head-light for automobiles or other vehicles the combination of a reflector, with a light-source mounted essentially at the focus of said reflector, a front pane covering up said reflector, and a convex mirror having its convexity directed essentially against said light-source and mounted within the upper front space between said reflector and said front pane with the lower edge thereof above the axial center of the light source, the radii of the outer or concave side of said convex mirror being shorter than the radial distance from the upper portion of the concave side of said convex mirror to the front pane.

PETER ANTON PETERS.